US008542967B2

(12) United States Patent
Gooijer et al.

(10) Patent No.: US 8,542,967 B2
(45) Date of Patent: Sep. 24, 2013

(54) DEPRESSED GRADED INDEX MULTI-MODE OPTICAL FIBER

(75) Inventors: Frans Gooijer, Eindhoven (NL); Gertjan Krabshuis, Sint-Oedenrode (NL); Elise Regnier, Saint-Laurent-des-Arbres (FR); Adrian Amezeua-Correa, Davidson, NC (US); Pieter Matthijsse, Hapert (NL); Denis Molin, Draveil (FR)

(73) Assignee: Draka Comteq, B.V. (NL)

( * ) Notice: Subject to any disclaimer, the term of this patent is extended or adjusted under 35 U.S.C. 154(b) by 0 days.

(21) Appl. No.: 13/209,132

(22) Filed: Aug. 12, 2011

(65) Prior Publication Data

US 2012/0039361 A1 Feb. 16, 2012

Related U.S. Application Data

(60) Provisional application No. 61/373,030, filed on Aug. 12, 2010.

(51) Int. Cl.
| | |
|---|---|
| *G02B 6/10* | (2006.01) |
| *G02B 6/36* | (2006.01) |
| *G02B 6/26* | (2006.01) |
| *G02B 6/28* | (2006.01) |

(52) U.S. Cl.
USPC .......................................... 385/124; 385/128

(58) Field of Classification Search
USPC ................. 385/129, 130, 131, 132, 140, 141, 385/28, 121, 123, 142, 37, 143–145
See application file for complete search history.

(56) References Cited

U.S. PATENT DOCUMENTS

| 4,741,747 A | 5/1988 | Geittner et al. |
| 6,853,798 B1 | 2/2005 | Weiss |
| 6,993,241 B2 * | 1/2006 | Bagnasco et al. ............. 385/142 |
| 7,315,677 B1 * | 1/2008 | Li et al. ......................... 385/123 |

(Continued)

FOREIGN PATENT DOCUMENTS

| EP | 0 915 064 A1 | 5/1999 |
| EP | 1 408 354 A1 | 4/2004 |

(Continued)

OTHER PUBLICATIONS

Dutch Search Report issued in Application No. 2005220; Dated Apr. 4, 2011 (With Translation).

(Continued)

*Primary Examiner* — Akm Enayet Ullah
(74) *Attorney, Agent, or Firm* — Shumaker, Loop & Kendrick, LLP (57) ABSTRACT

A multi-mode optical waveguide fiber including a central core region having an outer radius surrounded by an inner cladding region having an outer radius, the inner cladding region having a lower index of refraction than the central core region, wherein both the central core and inner cladding regions are doped with fluorine, wherein the refractive index profile of the central core region is of the gradient index type and the central core region in the range of $r \in [0 - r_a]$ comprises germanium at a maximum concentration within the range of 0.5 percent by weight to 4.0 percent by weight taken at a given radius, wherein said fiber has an Overfilled Modal Bandwidth >500 MHz·km at a wavelength of 850 nm and 1300 nm, according to IEC 60793-2-10.

19 Claims, 7 Drawing Sheets

(56) References Cited

U.S. PATENT DOCUMENTS

| | | |
|---|---|---|
| 7,519,256 B2 | 4/2009 | Terpsma et al. |
| 2004/0071432 A1 | 4/2004 | Bagnasco et al. |
| 2005/0000253 A1 | 1/2005 | Xie et al. |
| 2005/0041943 A1 | 2/2005 | Milicevic et al. |
| 2005/0120751 A1 | 6/2005 | Simons et al. |
| 2008/0050075 A1* | 2/2008 | Fleming et al. ............... 385/123 |
| 2008/0063812 A1 | 3/2008 | Deckers et al. |
| 2010/0254653 A1* | 10/2010 | Molin et al. .................... 385/28 |

FOREIGN PATENT DOCUMENTS

| | | |
|---|---|---|
| EP | 1 895 337 A1 | 3/2008 |
| FR | 2 922 657 A1 | 4/2009 |
| GB | 2 100 464 A | 12/1982 |
| JP | A-60-051635 | 3/1985 |
| JP | A-60-096545 | 5/1985 |
| JP | A-2006-133314 | 5/2006 |
| WO | WO 2009/078962 A1 | 6/2009 |

OTHER PUBLICATIONS

Dutch Written Opinion issued in Application No. 2005220; Dated Apr. 4, 2011.

* cited by examiner

DEPRESSED GRADED INDEX MULTI-MODE OPTICAL FIBER

CROSS-REFERENCE TO RELATED APPLICATION

This application claims priority to U.S. Provisional Application No. 61/373,030 filed Aug. 12, 2010, the contents of which are incorporated by reference herein.

TECHNICAL FIELD AND BACKGROUND

The present invention relates to a special multi-mode optical fiber (multimode fiber or MM fiber or fibre). A multi-mode optical fiber is a type of optical fiber mostly used for communication over shorter distances, such as within a building or on a campus. Typical multimode links have data rates of 10 Mbit/s to 10 Gbit/s over link lengths of up to 600 meters—more than sufficient for the majority of premises applications.

The equipment used for communications over multi-mode optical fiber is much less expensive than that for single-mode optical fiber. Typical transmission speed/distance limits are 100 Mbit/s for distances up to 2 km (100BASE-FX), 1 Gbit/s to 220-550 m (1000BASE-SX), and 10 Gbit/s to 300 m (10 GBASE-SR).

Because of its high capacity and reliability, a multi-mode optical fiber generally is used for backbone applications in buildings. An increasing number of users are taking the benefits of fiber closer to the user by running fiber to the desktop or to the zone. Standards-compliant architectures such as Centralized Cabling and Fiber to the Telecom Enclosure offer users the ability to leverage the distance capabilities of fiber by centralizing electronics in telecommunications rooms, rather than having active electronics on each floor.

In order to minimize intermode dispersion, the multimode optical fibers used in telecommunications generally comprise a core of refractive index that decreases progressively going from the center of the fiber to its junction with the cladding.

An optical fibre having a refractive index profile is to be understood as meaning that the refractive index of the core of the optical fibre has a gradient index shape that complies with the formula:

$$n(r) = n_1 \sqrt{\left(1 - 2\Delta\left(\frac{r}{a}\right)^\alpha\right)}$$

being relevant for r<a in the core.
Herein
$n(r)$=refractive index at a radius r=r
$n_1$=refractive index of the core at the fibre axis (r=0)
$n_2$=refractive index of the (inner) cladding surrounding the core
$\Delta$=normalised refractive index difference:

$$\Delta = \frac{n_1^2 - n_2^2}{2n_1^2}$$

α=profile exponent, alpha value
a=core radius [μm]
r=distance from the axis of the fibre [μm]
The parameter Δ is known as the index contrast; and for $\Delta \ll 1$, $$n(r \geq a) = n_0 \cdot (1 - \sqrt{1 - 2\Delta}) \approx \Delta \cdot n_0$$

So-called "α profile" fibers and their method of fabrication are disclosed in document U.S. Pat. No. 3,989,350.

Multi-mode fibers are described by their core and cladding diameters. Thus, a 62.5/125 μm multi-mode fiber has a core size of 62.5 micrometers (μm) and a cladding diameter of 125 μm. In addition, multi-mode fibers are described using a system of classification determined by the ISO 11801 standard—OM1, OM2, and OM3—which is based on the bandwidth of the multi-mode fiber. OM4 (defined in TIA-492-AAAD) was finalized in August 2009, and was published by the end of 2009 by the TIA.

In fiber optics, a graded-index or gradient-index fiber is an optical fiber whose core has a refractive index that decreases with increasing radial distance from the fiber axis (the imaginary central axis running down the length of the fiber).

Because parts of the core closer to the fiber axis have a higher refractive index than the parts near the cladding, light rays follow sinusoidal paths down the fiber. The advantage of the graded-index fiber compared to multimode step-index fiber is the considerable decrease in modal dispersion.

The most common refractive index profile for a graded-index fiber is very nearly parabolic (α≈2). The parabolic profile results in continual refocusing of the rays in the core, and minimizes modal dispersion.

This type of fiber is normalized by the International Telecommunications Union ITU-T at recommendation G.651: "Characteristics of a 50/125 μm multimode graded index optical fiber cable"

The present invention relates in general to temperature sensors, and in particular to a new class of optical fiber distributed temperature sensors suited to use in harsh, hydrogen-containing environments.

Various documents relating to optical fibres exist.

For instance, U.S. Pat. No. 4,741,747 (A), U.S. Pat. No. 7,519,256 (B2), US 2005120751 (A1), US 2005000253 (A1), US 2008063812 (A1), and US 2005041943 (A1) recite methods of manufacturing an optical fibre.

Also U.S. Pat. No. 6,853,798 B1 recites optical fibers.

One of the niche applications for fiber optics is distributed temperature sensing in geothermal wells. A temperature profile obtained shortly after drilling will determine potential of a well for use in power generation, and provides guidance as to how to best harness heat generated by the well.

Additionally, long-term thermal monitoring of a power-producing geothermal well is needed to operate the well so that production of electric power is optimized. Additional water must periodically be re-injected into the well, resulting in localized cooling. Efficient operation of a geothermal well often requires that the re-injection point be moved to a hotter region of the well. It is well known in the art that a vertical temperature profile of an entire geothermal well can be obtained essentially instantaneously using a single optical fiber. As a result, use of an optical-fiber distributed temperature sensing system as a geothermal well logging tool is held to offer much potential.

Operating principles of a typical optical fiber distributed temperature sensor follow below. When light of a frequency ω interacts with a medium in which molecular or lattice vibration is taking place at a frequency $\omega_r$, said light will be Raman scattered from the medium. The scattered light will include frequencies of $\omega \pm \omega_r$ as well as the original frequency ω. A portion of this scattered light propagates opposite to the propagation direction of the incident light, or is back scattered.

Intensity of the various frequency components of the back scattered light are found to depend on the temperature of the medium at the point where the back scattered light is generated. Accordingly, proper detection and analysis of the back scattered light in a medium allows one to determine the distribution of temperature in that medium.

In a prior art optical fiber distributed temperature sensor, a light of a known frequency is introduced into an optical fiber whose temperature distribution along its length is to be measured. The back scattered light is collected, and spectral analysis of the back scattered light is carried out using time domain techniques, among others.

A result is a relationship between temperature of the back scattering medium and time. As the back scattering medium is part of the optical fiber, however, the time when the back scattered radiation is collected for analysis is directly related to the distance along the fiber where the back scattering medium is located. Thus, the relation between temperature and time can be easily converted into the desired relation between temperature and position along the fiber.

As mentioned before, use of an optical fiber distributed temperature sensor for monitoring and evaluation of geothermal wells is considered to be an attractive possibility in the art. For such use to be practical, however, requires that the optical fiber to be placed in the geothermal well can survive the harsh downhole environment for a period measured in years.

Field tests of optical fiber distributed temperature sensors in geothermal wells have demonstrated that conventional optical fibers are insufficiently robust for this type of application. In the hotter wells studies, anomalies associated with changes in the optical transmission characteristics of the optical fibers used were seen in as little as 24 hours. The optical fibers were rendered useless for the intended application within time periods far shorter than the required service life.

Transmission anomalies were found to relate to the formation of OH ions in the silicate glass matrix of the optical fibers. These OH ions did not exist in the optical fibers prior to their exposure to the downhole environment. The likely degradation mechanism is that hydrogen in the hot downhole environment diffuses into the fiber, and there reacts with the oxygen of the silicate glass to form OH ions.

The constituents of the glass are found to have a strong influence on the rate at which OH ions are formed in a typical downhole environment. Optical fibers typically have a core glass with a refractive index which is larger than that of a surrounding cladding glass. An optical fiber can have a step-index structure, where there is an essentially abrupt interface between the core and the cladding glasses, or can have a graded-index structure, where the properties of the fiber vary in a graded manner radially in the.

A common usage is to introduce germanium to increase the core refractive index, relative to the index of the surrounding cladding. It has been found, however, that the presence of germanium promotes the formation of OH ions in the downhole environment. As a consequence such is discouraged.

Phosphorous is also commonly added to the glass to improve manufacturing characteristics by reducing the viscosity of the glass. Phosphorous is found to promote the formation of OH ions to a greater extent than does germanium. Generally, then, commercially available optical fibers comprise materials which render them susceptible to hydrogen damage through OH ion formation.

The only solution to this problem which seems to have been explored by the geothermal industry is to introduce a hydrogen diffusion barrier at the surface of the optical fiber, to attempt to prevent diffusion of hydrogen into the fiber. Various barrier coatings, such as carbon, silicon oxynitride, and aluminum, have been investigated. Although such barrier coatings are found to be effective at low temperatures, their effectiveness largely disappears at higher temperatures, typically in excess of 250° C. As many geothermal applications involve exposure to environments hotter than this, such barrier coatings do not provide adequate protection for optical fiber distributed temperature sensors in geothermal applications.

Both phosphorous-free and germanium-free fibers have been tested in hot hydrogen-containing environments. However, even a step-index fiber with a pure silica core exhibits unacceptable levels of OH ion formation.

It is commonly held in the geothermal industry that routine usage of optical fiber-based sensors, and in particular distributed temperature sensors, as downhole instrumentation in geothermal wells is highly desirable. Other types of fiber-optic-based downhole sensors, such as interferometric strain and tilt sensors, are also desirable for use in hot, hydrogen-containing environments, but are difficult to implement owing to OH ion formation in the optical.

There therefore exists need for optical fiber-based sensors, and in particular for optical fiber distributed temperature sensors, which comprises an optical fiber sufficiently resistant to OH ion formation within the downhole environment that said fiber, and hence said sensor, has a service life of sufficient duration for the intended applications. Further the fiber and sensor should be less sensitive to hydrogen, and have a superior bandwidth.

BRIEF SUMMARY

In a first aspect the present invention relates to a multi-mode optical waveguide fiber comprising a central core region having an outer radius $r_a$, surrounded by an inner cladding region having an outer radius $r_{ic}$, said inner cladding region having a lower index of refraction than said central core region, wherein both the central core region and the inner cladding region are doped with fluorine, characterized in that the refractive index profile of the central core region is of the gradient index type and said central core region in the range of r $[0-r_a]$ comprises germanium at a maximum concentration within the range of 0.1 percent by weight to 4.0 percent by weight taken at a given radius, wherein said fiber has an Overfilled Modal Bandwidth >500 MHz·km at a wavelength of 850 nm and 1300 nm, according to IEC 60793-2-10.

A depressed (graded index multi-mode) (DGIMM) optical fiber relates to a fiber having a refractive index profile wherein the refractive index of an outer layer, such as a cladding layer, such as the present inner cladding layer, is lower than that of the core region. In particular, the central core's maximum refractive index difference (for example: between core and pure silica) is approximately equal to zero. It is within the scope that the refractive index difference at the center of the core can be somewhat positive.

The present fiber provides excellent characteristics, especially in terms of reduction of hydrogen-induced attenuation. Such attenuation is caused by presence of hydrogen in an environment of the present fiber, such as in an oil well, in a gas well, and in a geothermal application. In such an environment hydrogen penetrates into the fiber. As a consequence so called hydrogen induced losses (HIL) appear. These losses attribute to a significant loss of up to 20 dB/km fiber at 1384 nm. The present fiber reduce these losses to less than 1 dB/km, typically less than 0.2 dB/km at 1384 nm. As such the present fiber is specifically well suited for use in a harsh environment, such as one containing hydrogen ($H_2$). In an exemplary embodiment, a multi-mode optical waveguide fiber having an overfilled modal bandwidth >500 Mhz·km is provided herein, wherein the fiber has an absolute change in attenuation at the range from 1200-1550 nm of less than 2 dB/km, after exposure to hydrogen ($H_2$) in conditions wherein the fiber is maintained for 168 hours at 150 degrees Centigrade in 200 atm (2938 psi) of a gas containing 3 vol % hydrogen, and is annealed for 6 days at 70 degrees Centigrade in an atmosphere of air.

Figure 1:
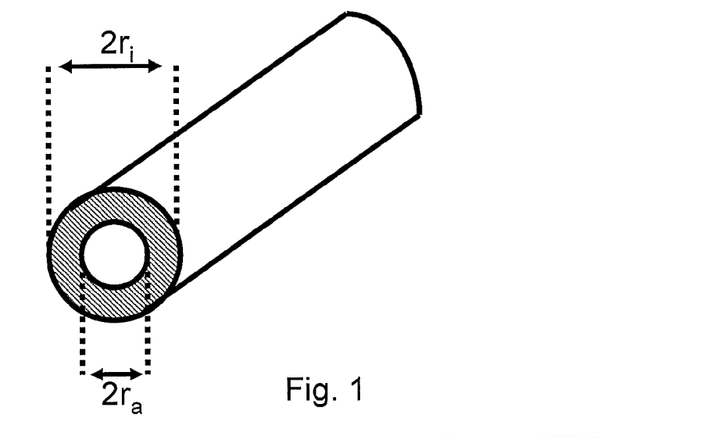
FIG. 1 shows schematically a fiber according to the invention.
Figure 2A:
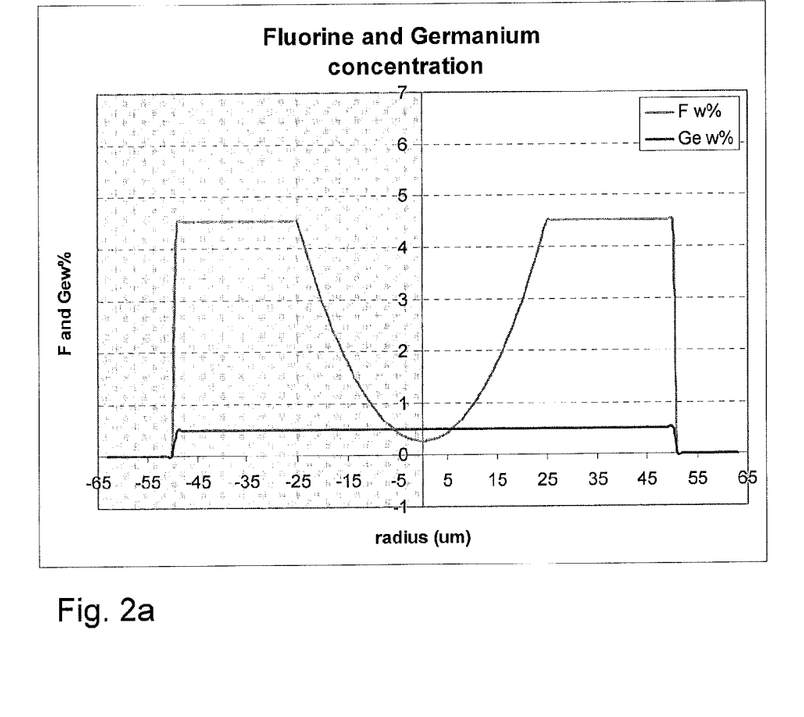
FIG. 2 shows schematically profiles of a fiber according to the invention.
Figure 2B:
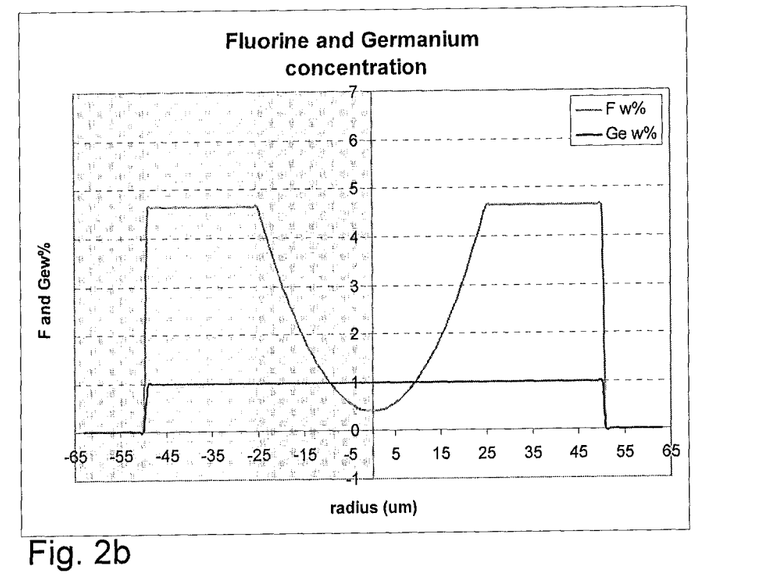
Figure 2C:
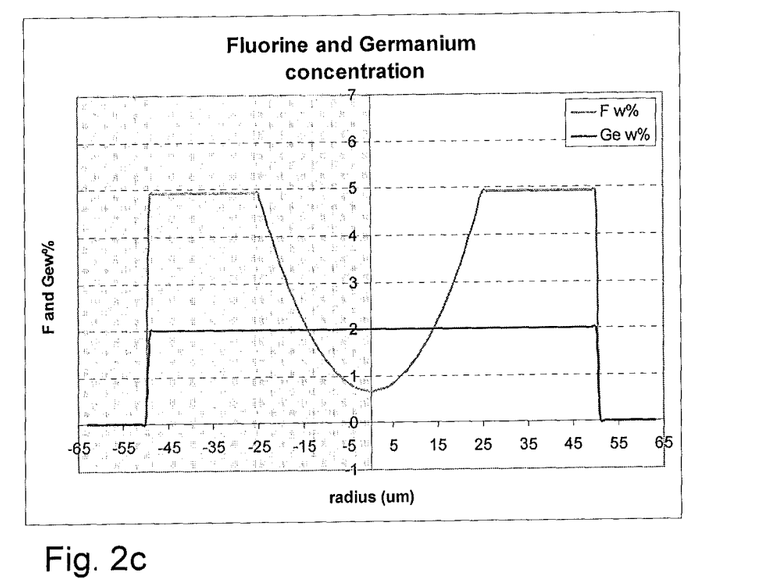
Figure 2D:
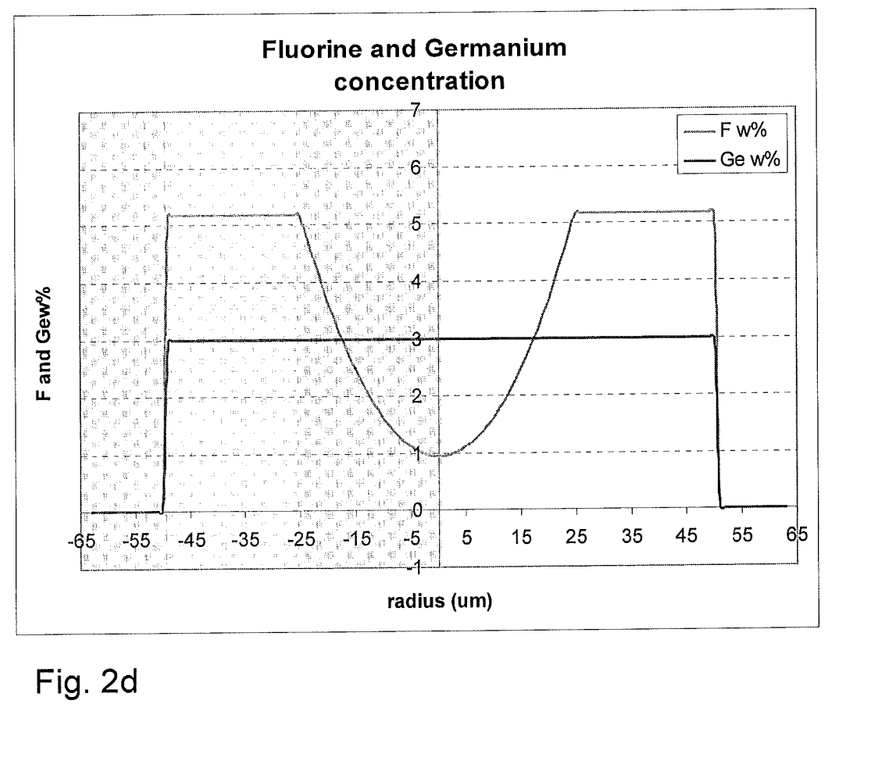

The present fiber comprises a core region having an outer radius $r_a$, surrounded by an inner cladding region having an outer radius $r_{ic}$ as is shown schematically in FIG. 1. Light will propagate through the present fiber in use.

The present fiber comprises fluorine in both the central region and inner cladding. Such fluorine is in an example provided in a PCVD process.

The present fiber further comprises germanium, optionally in both the central region and inner cladding. It is noted that in general it is not favorable to add germanium to the core. A person skilled in the art will typically avoid to use germanium in order to avoid hydrogen sensitivity in H-rich and/or high temperature environments. Other drawbacks are that germanium is costly and it increases attenuation losses.

It is noted that all percentages given are on a weight basis, wherein an amount of fluorine or germanium is relative to the total mass, taken at a certain radius. The percentage dopant (e.g. fluorine and germanium) is varied during a process of manufacturing, such as during a PCVD process.

The present fiber is further designed to have an Overfilled Modal Bandwidth >500 MHz·km at a wavelength of 850 nm and 1300 nm, according to IEC 60793-2-10.

As such the present fiber overcomes one or more of the above disadvantages, without jeopardizing favorable characteristics.

Advantages of the present description are detailed throughout the description.

DETAILED DESCRIPTION OF THE EMBODIMENTS

In a first aspect the present invention relates to a multi-mode optical waveguide fiber comprising a central core region having an outer radius $r_a$, surrounded by an inner cladding region having an outer radius $r_{ic}$, said inner cladding region having a lower index of refraction than said central core region, wherein both the central core region and the inner cladding region are doped with fluorine, characterized in that the refractive index profile of the central core region is of the gradient index type and said central core region in the range of r∈[0-$r_a$] comprises germanium at a maximum concentration within the range of 0.1 percent by weight to 9.0 percent by weight and preferably 0.5 percent by weight to 4.0 percent by weight taken at a given radius, wherein said fiber has an Overfilled Modal Bandwidth >500 MHz·km at a wavelength of 850 nm and 1300 nm, according to IEC 60793-2-10.

In an example the invention relates to a multi-mode optical waveguide fiber, wherein the central core region comprises germanium at a concentration within the range of about 0.1 percent by weight to about 4.0 percent by weight taken at a given radius and preferably within the range of about 0.5 percent by weight to about 3.5 percent by weight.

In an example the invention relates to a multi-mode optical waveguide fiber, wherein the central core region comprises germanium at a concentration within the range of about 4.0 percent by weight to about 9.0 percent by weight taken at a given radius.

Various profiles can be manufactured. For instance, the concentration of germanium may gradually decrease from a center of the core region (r=0) to the outer radius thereof ($r_a$). Such decrease may for instance follow an substantially parabolic shape. A central concentration may for instance be about 2.5 wt. %, and an concentration at or near the outer radius of the core may for instance be about 1.2 wt. %.

If the concentration of germanium is too low the hydrogen induced losses still appear and are hardly reduced. Is had been found experimentally that satisfactory results in this respect are obtained with germanium concentrations of more than 0.1 wt. %. Good results are obtained with maximum germanium concentrations of more than 1 wt. %, such as 1.8 wt. % or 3.5 wt. %. It is noted that it is difficult to increase the concentration of germanium to more than 5 wt. %. Further, higher concentrations are somewhat costly, and therefore less favorable.

In an example the invention relates to a multi-mode optical waveguide fiber, wherein the concentration of germanium in the central core region is constant or varies substantially parabolically over the radial distance and decreases within the central core region from r=0 to r=$r_a$, and remains preferably substantially constant over the inner cladding region. It has been found experimentally that satisfactory results are obtained.

In an example the invention relates to a multi-mode optical waveguide fiber, wherein the central core region comprises germanium at a constant concentration and a concentration of fluorine increases as the radial distance increases from the central axis r=0 to the outer circumference of the central core region r=$r_a$, wherein preferably the concentration of fluorine at r=$r_a$ is from 0.005% by weight to 7.0% by weight taken at radius $r_a$, more preferably the concentration at r=$r_a$ is from 0.1% by weight to 5.0% by weight taken at radius $r_a$.

With a "constant" concentration a concentration is meant which does not vary a lot from r=0 to r=$r_a$. Typically the concentration varies less than ±10% relative to an average concentration, take over a radius from r=0 to r=$r_a$.

In an example the invention relates to a multi-mode optical waveguide fiber, wherein the concentration of fluorine in the central core region varies substantially parabolically over the radial distance and increases within the central core region from r=0 to r=$r_a$ and remains preferably substantially constant over the inner cladding region. In an example the central fluorine concentration is about 0.5 wt. %, whereas at the outer radius it is about 5 wt. %.

In an example the invention relates to a multi-mode optical waveguide fiber, wherein the inner cladding region comprises germanium at a concentration within the range of 0.005 percent by weight to 5.0 percent by weight taken at a given radius.

In an example the invention relates to a multi-mode optical waveguide fiber, wherein the inner cladding region comprises germanium at a concentration within the range of about 0.1 percent by weight to about 3.0 percent by weight, preferably from 0.2 percent by weight to 2.0 percent by weight. It has been found that below 0.1 wt. % hardly no effect in relation to hydrogen induced attenuation is obtained. Good results were obtained at relatively moderate concentrations, such as from 0.5 wt. %-3 wt. %. Higher concentrations may be applied as well, but these higher concentrations do not significantly reduce the hydrogen induced attenuation further, compared to moderate concentrations.

In an example the invention relates to a multi-mode optical waveguide fiber, wherein the concentration of fluorine in the central core region increases as the radial distance increases from the central axis r=0 to the outer circumference of the central core region r=ra.

In an example the invention relates to a multi-mode optical waveguide fiber, wherein the alpha (α) value of the gradient index type profile of said central core region is between 1.9-2.1. Preferably the alpha value is close to 2.0, e.g. from 1.99-2.01, when measured at an operating wavelength of a fiber.

In an example the invention relates to a multi-mode optical waveguide fiber, wherein attenuation at 850 nm is less than 2.3 dB/km, preferably less than 2.1 dB/km, more preferably less than 2.0 dB/km. Such is achieved by providing the present fiber.

In an example the invention relates to a multi-mode optical waveguide fiber, wherein attenuation at 1310 nm is less than 0.6 dB/km, preferably less than 0.5 dB/km, more preferably less than 0.4 dB/km. Such is achieved by providing the present fiber.

In an example the invention relates to a multi-mode optical waveguide fiber, wherein the Numerical Aperture (NA) of the core is 0.200±0.015. Such is achieved by providing the present fiber.

In an example the invention relates to a multi-mode optical waveguide fiber, wherein the bending loss at 850 nm and at 1300 nm for 100 turns around a cylinder of 75 mm diameter is <0.5 dB. Such is achieved by providing the present fiber.

In an example the invention relates to a multi-mode optical waveguide fiber, wherein the inner cladding comprises one or more trenches, wherein the trench preferably has a width of 2%-33% more preferably 2%-8% of the core radius $r_a$, and/or wherein the trench preferably has a depth with respect to the inner cladding (defined as $\Delta n_r = n_r - n_{ic}$) of $-5 \times 10^{-3}$ to $-1 \times 10^{-3}$, and/or wherein the trench preferably is located between the core radius $r_a$ and the outer radius $r_{ic}$. For a fiber having a core radius of 25 μm the width may be from 0.5 μm-2 μm.

In an example the invention relates to a multi-mode optical waveguide fiber, wherein the inner cladding comprises one or more trenches, wherein the trench preferably has a width of 13%-22%.

The trench may be located adjacent to the central region, adjacent to the outer radius of the inner cladding, or somewhere in between.

By providing an inner cladding with a trench it has been experimentally found that bending losses (per turn around a cylinder) are reduced significantly, e.g. by—up to 1.0 dB per 2 turns around cylinders of 10 mm, 15 mm and 30 mm diameter. This effect increases applicability of the present fiber dramatically, e.g. in situations wherein limited space is available to use the fiber.

In an example the invention relates to a multi-mode optical waveguide fiber, wherein the central core region and inner cladding region all comprise silica deposited via a plasma chemical vapor deposition process (PCVD). The PCVD process is specifically suited for providing the present fibers.

In an example the invention relates to a multi-mode optical waveguide fiber, where the core radius $r_a$ is 25±2 μm. Such a fiber relates to a typical optical fiber.

In an example the invention relates to a multi-mode optical waveguide fiber, wherein the fiber has an absolute change in attenuation of signal light at a range of 1200-1550 nanometers of less than 0.5 dB/km, preferably less than 0.3 dB/km, for the following conditions, wherein the fiber is maintained for 5 days at 70 degrees Centigrade in an inert atmosphere containing 1 vol. % hydrogen, and is annealed for 6 days at 70 degrees Centigrade in an atmosphere of air. Such is achieved by providing the present fiber.

In an example the invention relates to a multi-mode optical waveguide fiber, wherein the inner cladding region is further surrounded by an outer cladding region. An outer cladding region provides further protection of the fiber.

In an example the invention relates to a multi-mode optical waveguide fiber, wherein the outer cladding has a higher refractive index than the inner cladding region and may be silica doped with one or more dopants, preferably germanium and/or fluorine, wherein the outer cladding is preferably pure silica. Such may improve optical characteristics of the present fiber. Typical dopant concentrations are as given above.

In an example the invention relates to a multi-mode optical waveguide fiber, wherein the outer cladding comprises, optionally fluorine and/or germanium doped, glass layers, such as glass layers obtainable by an inside plasma deposition process.

Depending on the process of manufacture the present fiber may comprise subsequently deposited glass layers. Therein concentration of dopants may vary.

In an example the present fiber is produced by a PCVD process.

In an example the invention relates to a multi-mode optical waveguide fiber, wherein the radius of the central core region is from 25±2.5 μm-31.25±2.5 μm and preferably a radius of 25±2.5 μm.

In an example the invention relates to a multi-mode optical waveguide fiber, wherein the outer radius $r_{ic}$ of the inner cladding region is $r_{ic}$ is in the range of [$Y_1$-62.5 μm], wherein $Y_1 \geq r_a+5$ μm, wherein preferably 40 μm<$r_{ic}$<50 μm. By providing such a fiber bending losses are reduced significantly.

In a second aspect the present invention relates to use of the present multi-mode optical waveguide fiber, at elevated temperature, such as at a temperature above 150° C., and/or in an environment with increased hydrocarbon and/or hydrogen content, such as in an oil well, in a gas well, and in a geothermal application.

In a third aspect the present invention relates to a method of sensing, such as temperature sensing, comprising providing the present multi-mode optical waveguide fiber, and transmitting an optical signal through said fiber.

In a fourth aspect the present invention relates to a distributed temperature sensor system including: a pulsed light source for emitting short pulses of light with a narrow bandwidth about an excitation frequency ω; a multi-mode optical waveguide fiber according to the invention, and having an input end; wherein said input end is disposed to receive pulses of light emitted from said pulsed light source; a beamsplitter disposed in-between said light source and said input end of said fiber; a time domain analyzer for analyzing, as a function of time elapsed since a pulse of light is emitted by said pulsed light source, the spectral components of back scattered light emitted by the input end of said fiber in response to said pulse of light impinging on said input end; wherein said beamsplitter is disposed to direct said back scattered light emitted from said input end into said time domain analyzer; thereby producing time-resolved spectral information; wherein said time domain analyzer uses said time-resolved spectral information to determine the distribution of temperature along the length of said fiber.

Such a system is for instance described in U.S. Pat. No. 6,853,798 B1.

The invention is further detailed by the accompanying figures and examples, which are exemplary and explanatory of nature and are not limiting the scope of the invention. To the person skilled in the art it may be clear that many variants, being obvious or not, may be conceivable falling within the scope of protection, defined by the present claims.

FIG. 1 shows schematically a fiber according to the invention, wherein $r_a$ is the outer radius of the core, and $r_i$ is the outer radius of the inner cladding.

FIGS. 2a-d show schematically profiles of examples of a fiber according to the invention. Therein fluorine and germanium concentration are give as a function of radius. At a given radius a concentration is given. Variation in concentration is achieved by varying concentration of a respective element during deposition of a quartz layer. The fluorine concentration varies substantially parabolically up to the outer radius of the core and remains constant towards the outer radius of the inner cladding. The germanium concentration is substantially constant over the core and inner cladding.

Figure 3:
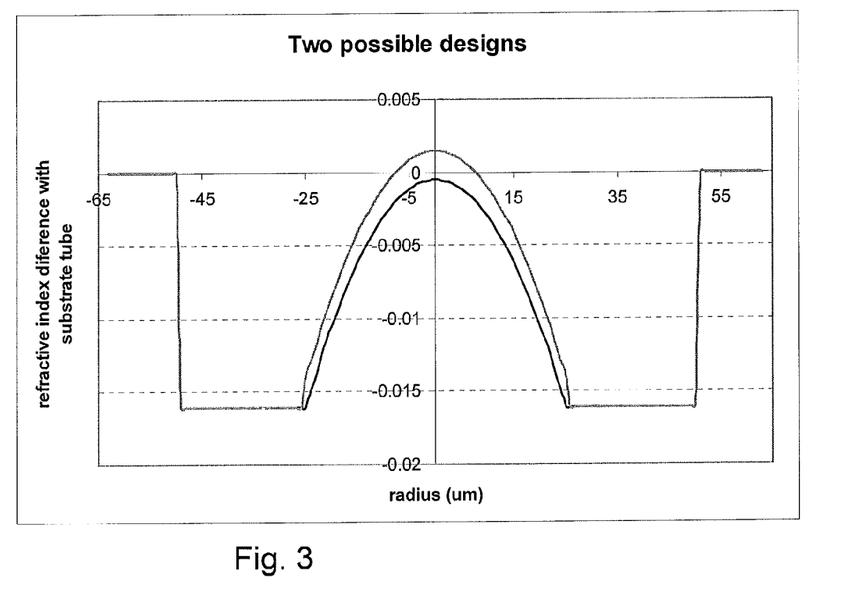
FIG. 3 shows schematically a refractive index profile of a fiber according to the invention.

FIG. 3 shows schematically a refractive index profile of a fiber according to the invention. Two profiles are given as an example. The refractive index difference is taken relative to a value at the outer radius of the inner cladding. The index follows an α profile.

Figure 4:
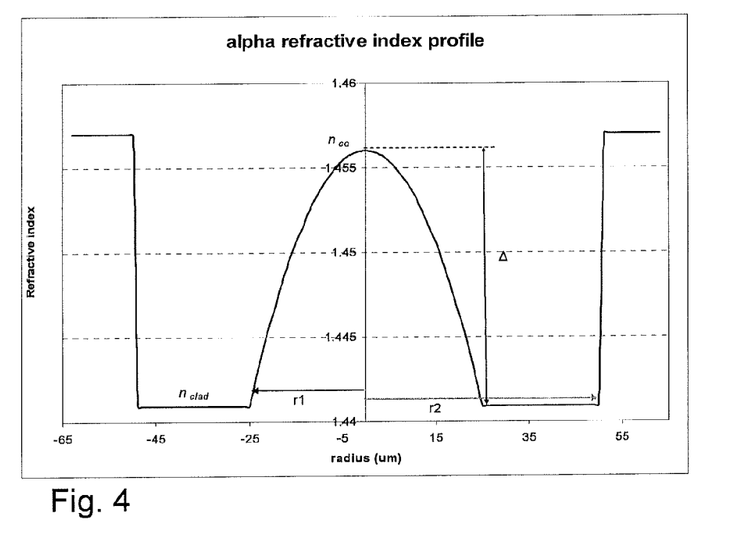
FIG. 4 shows schematically a refractive index profile of a fiber according to the invention.

FIG. 4 shows schematically a refractive index profile of a fiber according to the invention. The refractive index is taken as an absolute value, varying as a function of the radius. The index follows an α profile.

Figure 5A:
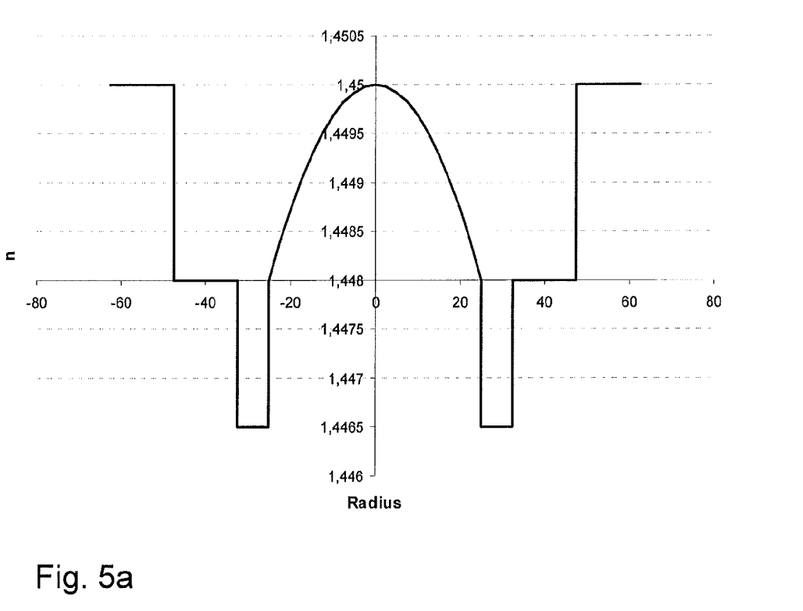
FIG. 5 shows schematically refractive index profiles of a fiber according to the invention.
Figure 5B:
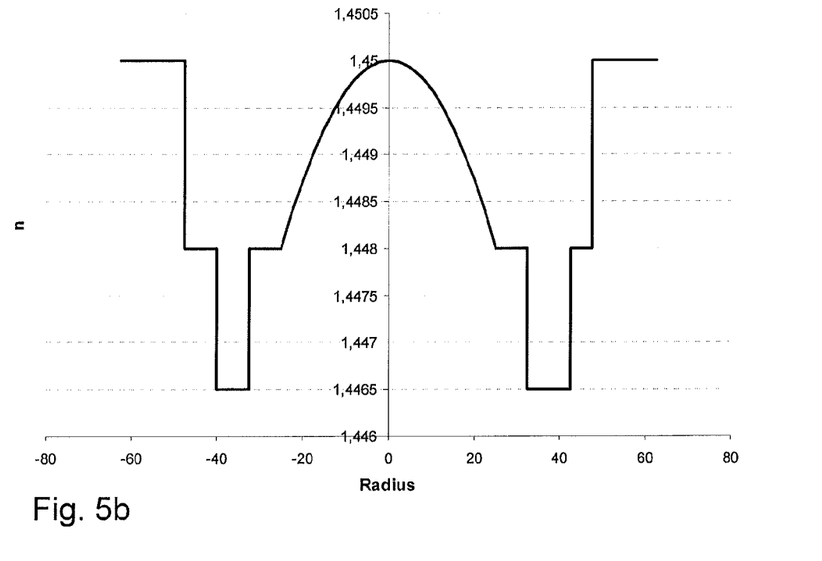

FIG. 5 shows schematically refractive index profiles of a fiber according to the invention. These profiles, compared to FIG. 4, are further provided with a trench. The trench starts, seen from inside to outside of the fiber, at the outer radius of the core, and ends at about ⅓ of the radius of the inner cladding.

Figure 6:
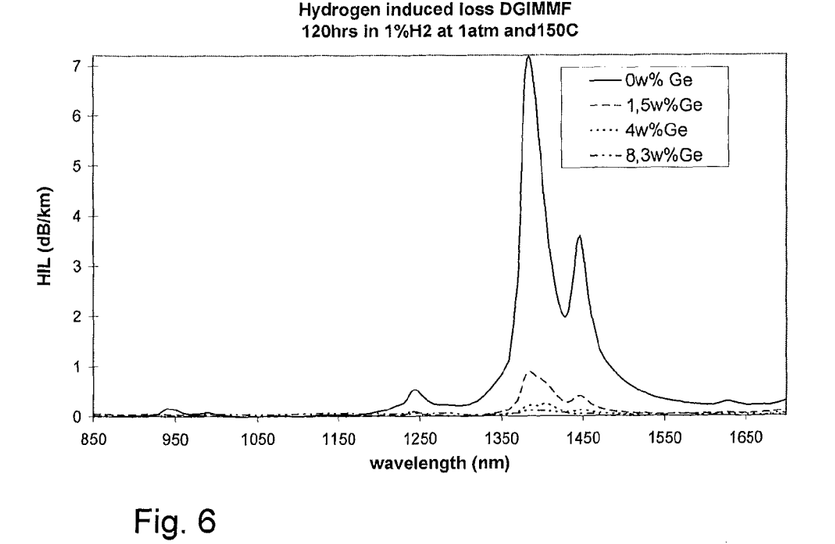
FIG. 6 shows hydrogen induced loss at a given frequency.

FIG. 6 shows hydrogen induced loss (HIL) at a given frequency. It is shown that an increase of the maximum germanium concentration in the core from 0 wt % to 3.3 wt % dramatically reduces the HIL. The HIL is measured for a DGIMM fiber during 120 hours in 1% $H_2$ at 1 atmosphere (101 kPa) and 150° C. At a wavelength of about 1380 nm the HIL is reduced from some 7 dB/km fiber to 0.1 dB/km, in other words almost by two orders of magnitude (100×).

Figure 7:
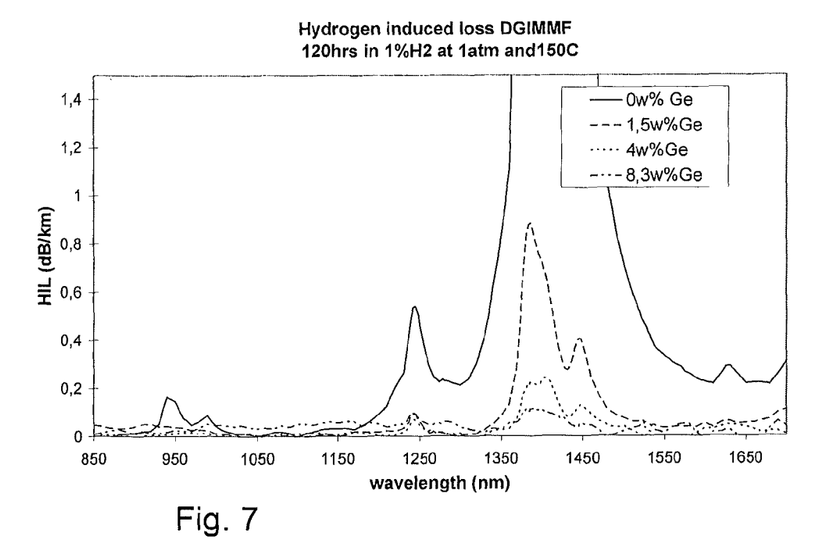
FIG. 7 shows a detail of FIG. 6.

FIG. 7 shows a detail of FIG. 6, further supporting the above statement.

Figure 8:
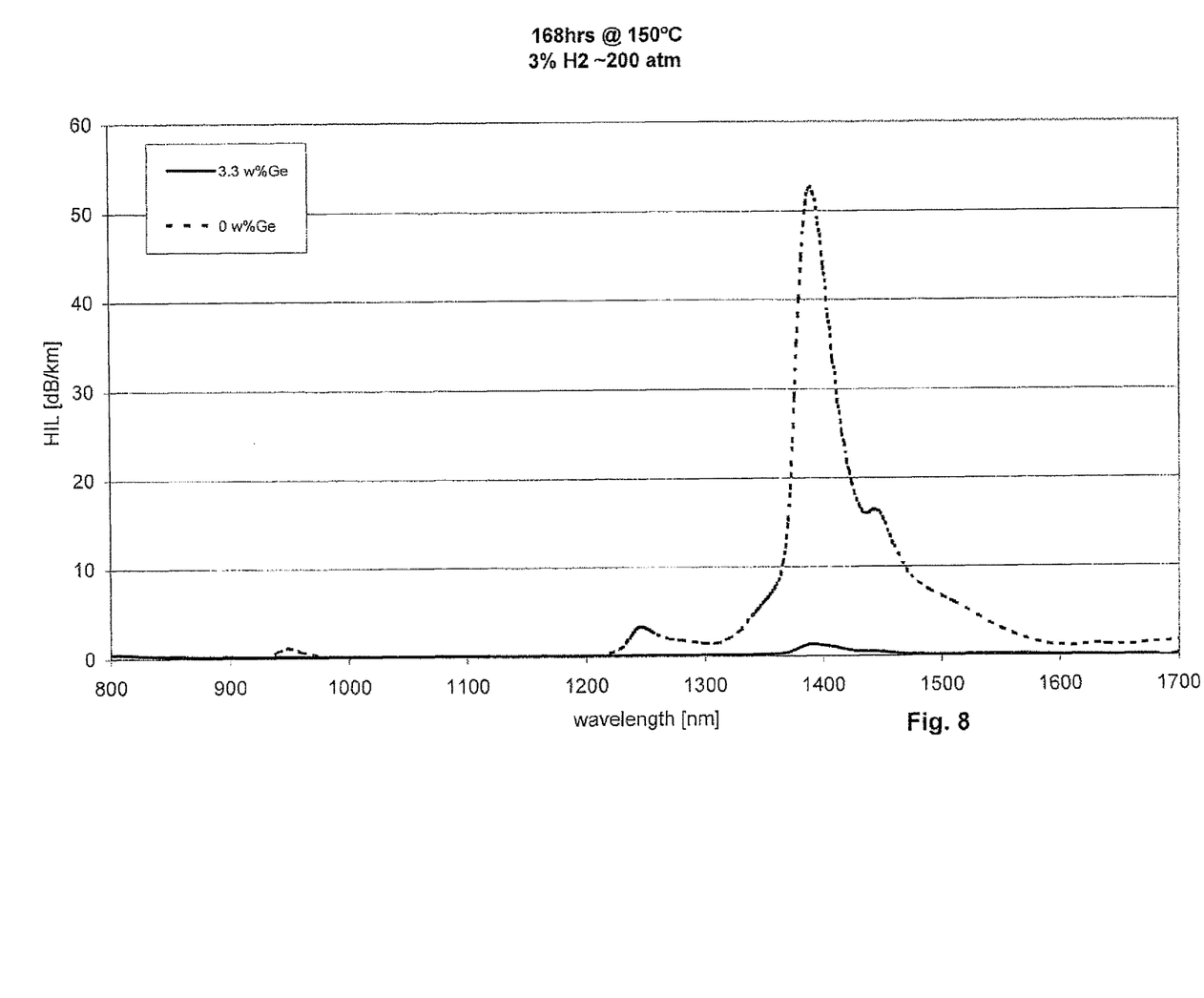
FIG. 8 shows hydrogen induced loss at a given frequency.

FIG. 8 shows hydrogen induced loss (HIL) at a given frequency. It is shown that an increase of the maximum germanium concentration in the core from 0 wt % to 3.3 wt % dramatically reduces the HIL. The HIL is measured for a DGIMM fiber during 168 hours in 3% $H_2$ at 200 atmosphere (20.2 mPa) and 150° C. At a wavelength of about 1380 nm the HIL is reduced from some 52.6 dB/km fiber to 1.3 dB/km, in other words over 40 times.

EXAMPLES

Comparative Example

A preform for depressed graded index multimode optical fibres was produced using a PCVD process wherein glass layers were deposited on the inner surface of a glass substrate tube. Such a process is known per se. The tube containing the glass layers was consequently collapsed in a manner known per se so as to form a solid bar-shaped preform. An optical fibre was drawn from this preform in the usual manner. The refractive index profile corresponds to the refractive index profile as schematically shown in FIGS. 2-4 (FIG. 3 lower curve, at r=0 the refractive index is equal to that of silica). The glass layers contained only fluorine as a dopant to reduce the refractive index.

The optical fibre had the following dimensions and properties:

Outer radius: 62.5 μm (i.e. radius of outer cladding; diameter of fiber 125 μm)
Inner cladding radius: 50 μm (i.e. diameter hereof 100 μm)
Core radius (a): 25 μm
$n_1$: n of silica (This is the n of the inner cladding)
Inner cladding radius: 25 μm
Outer cladding radius: 25 μm
NA: 0.2
Overfilled Bandwidth: >500 MHz·km The attenuation of the optical fibre was measured for wavelengths in the range of between 850 nm and 1700 nm in a manner known per se.

The fibre was then exposed to a hydrogen/nitrogen mixture containing 1% by volume of hydrogen, for a period of 120 hours at a temperature of 150° C., at ambient pressure (1 atmosphere; 101 kPa).

After exposure the fibre was cooled down to room temperature in a substantially hydrogen free environment for 24 hours. The attenuation of the exposed fibre was measured for wavelengths in the range of between 850 nm and 1700 nm in a manner known per se. Finally the value for the attenuation at each measured wavelength of the fibre before it was exposed was subtracted from the value for the attenuation at this wavelength of the fibre after it was exposed, yielding a so called Hydrogen Induced Loss (HIL) value for each wavelength.

FIGS. 6 and 7 show the result of this, wherein the solid line corresponds to the comparative example, [Ge] being 0 wt. %.

It can be seen very clearly that the exposure to hydrogen under the conditions set out above results in an increase in attenuation, especially in the wavelength range between about 1250 and about 1550 nm. The maximum value for the Hydrogen Induced Loss is about 7.2 dB/km and is observed at a wavelength of about 1385 nm.

Present Example

Three more optical fibres were manufactured using the same processes and conditions as for the comparative example with the exception that during the deposition process the core was co-doped with a relatively small amount of 1.5 wt % 1.8 wt % and 3.3 wt % Germanium (in the glass present as $GeO_2$) respectively. It is noted that this concentration is measured at or near the center of the optical fibre and may be somewhat lower at regions further away from the center.

The optical fibres were subjected to the same hydrogen exposure and measured in the same way as the optical fibre of the comparative example. The results can be found in FIGS. 6 and 7.

From FIGS. 6 and 7 it is clear that the loss induced by Hydrogen of fibres containing Germanium as a dopant in the core is significantly better than optical fibres without being doped with germanium. For the optical fibres co-doped with germanium having a maximum germanium concentration of 1.8 wt % and 3.3 wt % respectively the hydrogen-induced loss is almost negligible, i.e. close to 0 dB/km over the entire wavelength range 850-1700 nm. FIG. 8 further shows that even under 200 atm and with elevated Hydrogen content the hydrogen-induced loss is almost negligible compared to the fiber without Germanium in the core.

What is claimed is:

1. A multi-mode optical waveguide fiber comprising a central core region having an outer radius $r_a$, surrounded by an inner cladding region having an outer radius $r_{ic}$, said inner cladding region having a lower index of refraction than said central core region such that the fiber is depressed, wherein both the central core region and the inner cladding region are doped with fluorine, wherein the refractive index profile of the central core region is of the gradient index type and said central core region in the range of r∈[0-$r_a$] comprises germanium at a maximum concentration within the range of 0.5 percent by weight to 4.0 percent by weight taken at a given radius, wherein said fiber has an overfilled modal bandwidth >500 MHz.km at a wavelength of 850 nm and 1300 nm, according to IEC 60793-2-10, and wherein a maximum refractive index difference of the central core is substantially equal to zero.

2. The multi-mode optical waveguide fiber of claim 1, wherein the central core region comprises germanium at a concentration within the range of about 0.1 percent by weight to about 4.0 percent by weight taken at a given radius.

3. The multi-mode optical waveguide fiber according to claim 1, wherein the concentration of germanium in the central core region is constant or varies substantially parabolically over the radial distance and decreases within the central core region from r=0 to r=$r_a$, and remains substantially constant over the inner cladding region.

4. The multi-mode optical waveguide fiber according to claim 1, wherein the concentration of fluorine increases as the radial distance increases from the central axis r=0 to the outer circumference of the central core region r=$r_a$, wherein preferably the concentration of fluorine at r=$r_a$ is from 0.005% by weight to 7.0% by weight taken at radius $r_a$.

5. The multi-mode optical waveguide fiber according to claim 1, wherein the concentration of fluorine in the central core region varies substantially parabolically over the radial distance and increases within the central core region from r=0 to r=$r_a$ and remains preferably substantially constant over the inner cladding region.

6. The multi-mode optical waveguide fiber according to claim 1, wherein the inner cladding region comprises germanium at a concentration within the range of 0.1 percent by weight to 4.0 percent by weight taken at a given radius.

7. The multi-mode optical waveguide fiber according to claim 6, wherein the inner cladding region comprises germanium at a concentration within the range of about 0.5 percent by weight to about 3.0 percent by weight.

8. The multi-mode optical waveguide fiber according to claim 1, wherein the alpha (α) value of the gradient index type profile of said central core region is between 1.9-2.1.

9. The multi-mode optical waveguide fiber according to claim 1, wherein attenuation at 850 nm is less than 2.3 dB/km and/or wherein attenuation at 1310 nm is less than 0.6 dB/km.

10. The multi-mode optical waveguide fiber according to claim 1, wherein the Numerical Aperture (NA) of the core is 0.200±0.015 and/or where the core radius $r_a$ is 25±2.5 μm.

11. The multi-mode optical waveguide fiber according to claim 9, wherein the bending loss at 850 nm and at 1300 nm for 100 turns around a cylinder of 75 mm diameter is <0.5 dB.

12. The multi-mode optical waveguide fiber according to claim 1, wherein the inner cladding comprises one or more trenches, wherein each trench has a width of 2%-33% of the core radius $r_a$, and/or wherein each trench has a depth $\Delta n_t$ with respect to the inner cladding of $-5 \times 10^{-3}$ to $-1 \times 10^{-3}$, and/or wherein the trench preferably is located between the core radius $r_a$ and the outer radius $r_{ic}$.

13. The multi-mode optical waveguide fiber according to claim 12, wherein the central core region and inner cladding region all comprise silica deposited via a plasma chemical vapor deposition process.

14. The multi-mode optical waveguide fiber according to claim 1, wherein the fiber has an absolute change in attenuation of signal light at a range of 1200-1550 nanometers of less than 0.5 dB/km, for conditions wherein the fiber is maintained for 5 days at 70 degrees Centigrade in an inert atmosphere containing 1 vol. % hydrogen, and is annealed for 6 days at 70 degrees Centigrade in an atmosphere of air.

15. The multi-mode optical waveguide fiber of claim 14, further comprising an outer cladding surrounding the inner cladding, wherein the outer cladding has a higher refractive index than the inner cladding region and silica doped with one or more dopants, and wherein the outer cladding is preferably pure silica.

16. The multi-mode optical waveguide fiber of claim 15, wherein the outer cladding comprises a glass layer, obtained by an inside plasma deposition process.

17. The multi-mode optical waveguide fiber according to claim 1, wherein the outer radius $r_{ic}$ of the inner cladding region is $r_{ic}$ [$Y_1$–62.5 μm], wherein $Y_1 \geq r_a$+5 μm, wherein 40 μm<$r_{ic}$<50 μm.

18. The multi-mode optical waveguide fiber according to claim 1, wherein the fiber has an absolute change in attenuation at the range from 1200-1550 nm of less than 2 dB/km, after exposure to hydrogen ($H_2$) in conditions wherein the fiber is maintained for 168 hours at 150 degrees Centigrade in 200 atm (2938 psi) of a gas containing 3 vol % hydrogen, and is annealed for 6 days at 70 degrees Centigrade in an atmosphere of air.

19. A multi-mode optical waveguide fiber having an overfilled modal bandwidth >500 Mhz.km, wherein the fiber has an absolute change in attenuation at the range from 1200-1550 nm of less than 2 dB/km, after exposure to hydrogen ($H_2$) in conditions wherein the fiber is maintained for 168 hours at 150 degrees Centigrade in 200 atm (2938 psi) of a gas containing 3 vol % hydrogen, and is annealed for 6 days at 70 degrees Centigrade in an atmosphere of air.

* * * * *